United States Patent
Sheu et al.

(10) Patent No.: US 9,930,151 B2
(45) Date of Patent: Mar. 27, 2018

(54) METHOD AND APPARATUS FOR EXTENDING LOCAL AREA NETWORK PROTOCOLS TO WORK ACROSS THE INTERNET AND ESTABLISHING CONNECTIVITY WITHOUT DISCOVERY FOR LOCAL AREA NETWORK PROTOCOLS

(71) Applicant: Splashtop Inc., San Jose, CA (US)

(72) Inventors: Philip Sheu, Campbell, CA (US); Thomas Deng, Redwood City, CA (US); Mark M. Lee, Saratoga, CA (US); Robert Ha, Saratoga, CA (US); Victor Chin, San Jose, CA (US); Jian-Jung Shiu, Taipei (TW); Dengpan Gao, Hangzhou (CN)

(73) Assignee: Splashtop Inc., San Jose, CA (US)

( * ) Notice: Subject to any disclaimer, the term of this patent is extended or adjusted under 35 U.S.C. 154(b) by 288 days.

(21) Appl. No.: 14/964,133

(22) Filed: Dec. 9, 2015

(65) Prior Publication Data
US 2016/0173659 A1    Jun. 16, 2016

Related U.S. Application Data

(60) Provisional application No. 62/089,961, filed on Dec. 10, 2014.

(51) Int. Cl.
*G06F 15/16* (2006.01)
*H04L 29/06* (2006.01)
*H04L 12/24* (2006.01)
*H04L 29/12* (2006.01)
*H04L 29/08* (2006.01)

(52) U.S. Cl.
CPC .............. *H04L 69/24* (2013.01); *H04L 41/12* (2013.01); *H04L 61/1511* (2013.01); *H04L 61/1541* (2013.01); *H04L 67/08* (2013.01); *H04L 67/16* (2013.01)

(58) Field of Classification Search
USPC ......................................................... 709/230
See application file for complete search history.

*Primary Examiner* — Hee Soo Kim
(74) *Attorney, Agent, or Firm* — Perkins Coie LLP (57) ABSTRACT

Embodiments of the invention extend a network protocol that is limited to a local area network (LAN) and enable it to function across the Internet. A LAN protocol is limited to providing services or resources to users within the same LAN. Embodiments of the invention make it possible for those services and resources to be available to users beyond the LAN. Embodiments of the invention also concern establishing connectivity without discovery for local area network protocols.

20 Claims, 6 Drawing Sheets

METHOD AND APPARATUS FOR EXTENDING LOCAL AREA NETWORK PROTOCOLS TO WORK ACROSS THE INTERNET AND ESTABLISHING CONNECTIVITY WITHOUT DISCOVERY FOR LOCAL AREA NETWORK PROTOCOLS

CROSS-REFERENCE TO RELATED APPLICATIONS

This application claims priority to the U.S. provisional patent application Ser. No. 62/089,961 filed Dec. 10, 2014, which is incorporated herein by reference in its entirety.

TECHNICAL FIELD

The present application is related to a method for extending local area network protocols to work across the Internet and establishing connectivity without discovery for local area network protocols.

BACKGROUND

A local area network (LAN) protocol may consist of a discovery phase and a functional phase. The discovery phase is where a user on the local area network discovers the availability of a service or resource on the same local area network. The functional phase is where the service or resource is actually being used. An example of this is a shared printer. The discovery phase is where the printer broadcasts its availability to users within the LAN and where one of the users take notice. The functional phase is when the user actually prints to the shared printer.

For some protocols, the discovery phase is what limits the protocols to be LAN-only. A protocol's functional phase may actually be able to work across the Internet. But, because only users within the LAN can discover the service or resource, all actual uses become limited to the LAN.

SUMMARY

Embodiments of the invention extend a network protocol that is limited to a local area network (LAN) and enable it to function across the Internet. A LAN protocol is limited to providing services or resources to users within the same LAN. Embodiments of the invention make it possible for those services and resources to be available to users beyond the LAN.

Embodiments of the invention also extend the popular AirPlay protocol to work across the Internet. In its native form, AirPlay is used by iOS devices to stream to AirPlay receivers on the same network. Embodiments of the invention make it possible to stream from iOS devices directly to remote AirPlay receivers anywhere on the Internet.

Embodiments of the invention also concern establishing connectivity without discovery for local area network protocols.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Terminology

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Brief definitions of terms, abbreviations, and phrases used throughout this application are given below.

In the present application local area network is synonymous with LAN; Internet Protocol is synonymous with IP;

multicast Domain Name System is synonymous with mDNS; and quick responsive code is synonymous with QR code.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

Overview

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

Extending Local Network Protocols to Work Across the Internet

Embodiments of the invention extend a network protocol that is limited to a local area network (LAN) and enable it to function across the Internet. A LAN protocol is limited to providing services or resources to users within the same LAN. Embodiments of the invention make it possible for those services and resources to be available to users beyond the LAN.

Embodiments of the invention also include extend the popular AirPlay protocol to work across the Internet. In its native form, AirPlay is used by iOS devices to stream to AirPlay receivers on the same network. Embodiments of the invention make it possible to stream from iOS devices directly to remote AirPlay receivers anywhere on the Internet.

Extending the LAN Protocol

Embodiments of the invention replace the discovery phase of the LAN protocol with an alternative method that can go beyond the LAN. The result is that certain LAN protocols are able to provide services or resources across the Internet.

The discovery phase is normally performed by functions that result from logic defined within the LAN protocol itself. However, as taught herein, these functions can be performed with the help of an intermediary. The intermediary helps with communicating the availability of services and resources across the Internet.

In one embodiment of the invention, the intermediary is custom software running on a computer that is accessible by users within the LAN and outside of the LAN. The intermediary must learn about the availability of the resource that is available within the LAN. Therefore, it must be reachable by users within the LAN. The intermediary also must forward and share that resource with users across the Internet. Therefore the intermediary also needs to be reachable by users outside of the LAN. One common way for achieving this is to configure the firewalls on the network where the intermediary resides. The configuration, e.g. port forwarding, ensures all appropriate packets, whether from within the LAN or not, can be received by the intermediary.

In another embodiment of the invention, the intermediary is a cloud service that is massively scalable and is reachable by users in all geographies.

Creating New Possibilities

In its original form, a LAN protocol broadcasts a service or resource, indiscriminately, to all recipients in the local area network. When the discovery phase is performed instead by an intermediary, a wide range of new functionality becomes possible. The service or resource can now be made available to users who are not in the same LAN.

The service or resource can be made available to only certain users based on arbitrary rules. This capability adds a dimension of manageability and control that did not exist before. Some examples of these rules are:

Present service only to users in a specific geography.
Present service only to authorized users based on identity, defined by the service administrator.
Present service only to users in a certain organization.
Allocate and present different services to different groups of users based on pre-defined rules.

With the service being provided across the Internet, it can be routed through central servers on the Internet, which creates additional possibilities. These possibilities often are not attainable with LAN protocols that are designed for limited, one-to-one usage. Some possibilities are:

If the service is streaming content from one user's device to another's device, it now becomes possible to share the content with multiple users, all at different locations on the Internet. The audience can be as small as several participants in the same meeting or as large as massive global audience of a gaming session.
The content can also be recorded by the central servers.

Figure 1:
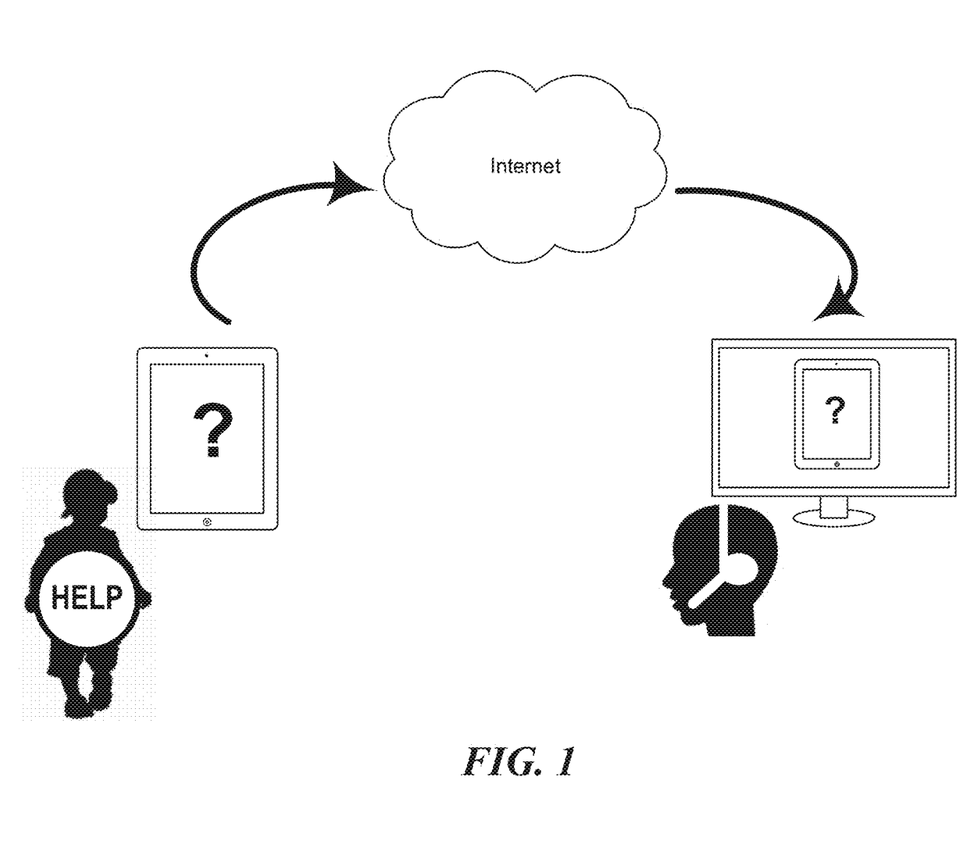
FIG. 1 is a block schematic diagram showing a usage model in which a support technician remotely supports a user's iOS device according to the invention with regard to extending local area network protocols to work across the Internet.

These new possibilities have several valuable applications, beyond the traditional limitations of LAN-only protocols:

For above mobile devices, enable a support technician to remotely assist a user with mobile device problems. FIG. 1 is a block schematic diagram showing a usage model in which a support technician remotely supports a user's iOS device according to the invention (see http://www.splashtop.com/remote-support for an example of a support application with which the invention may be practiced. Embodiment of the invention enable the support technician to see the user's iOS device screen for much easier support.

As an example, the user calls the support technician to get help on accessing his company email on the user's iPad. The support technician tells the user to download a Splashtop app on to the iPad. The app does two important things:

(1) It adds the support technician's computer into the iPad's AirPlay receiver list; and (2) It instructs the user on how to start AirPlay.

Once the user starts AirPlay and chooses the technician's computer from the AirPlay receiver list, the iPad screen then becomes visible to the support technician.

Figure 2:
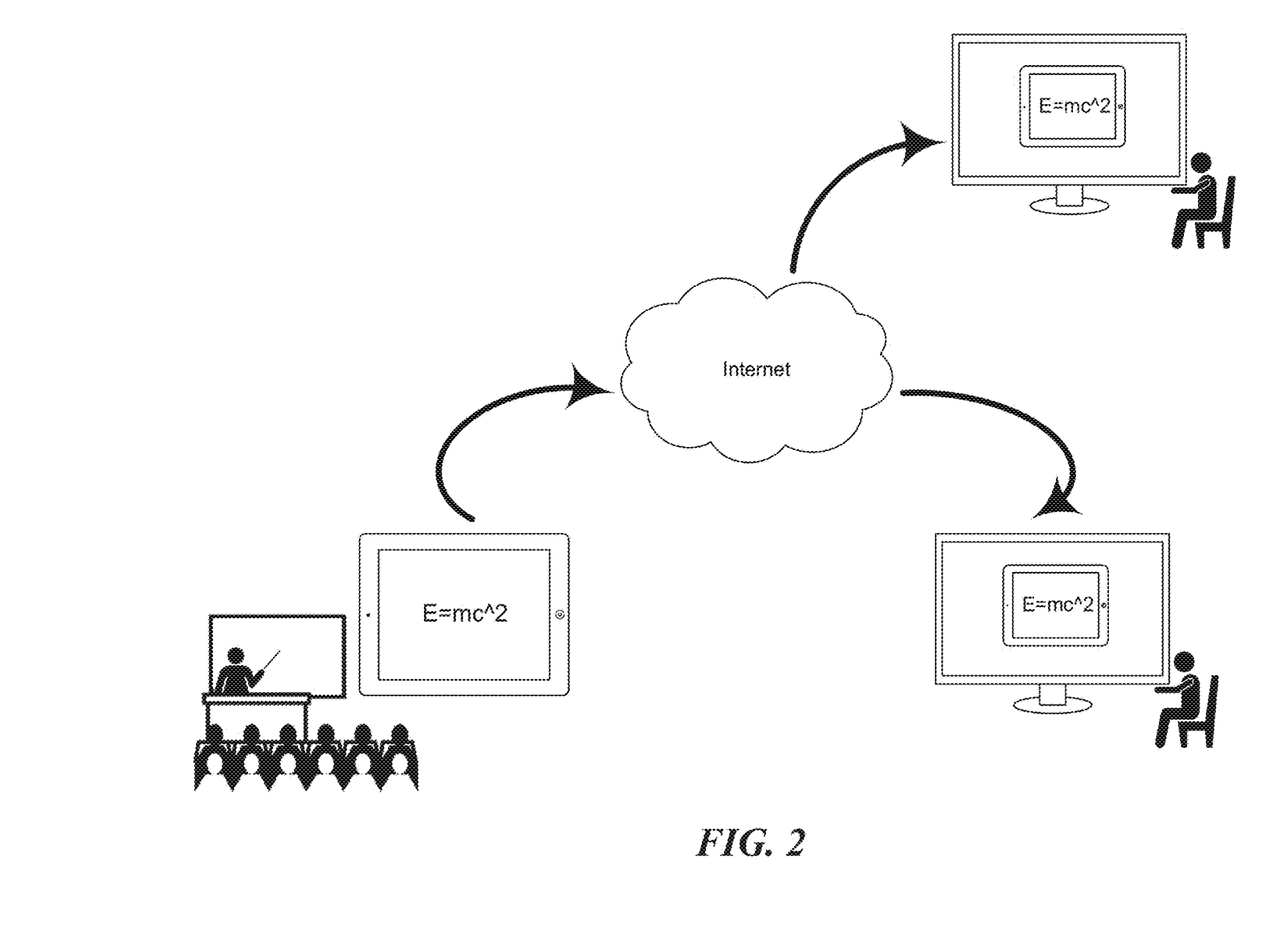
FIG. 2 is a block schematic diagram showing a usage model in which a teacher shows instructional apps and content on an iOS device to students across the Internet according to the invention with regard to extending local area network protocols to work across the Internet.

For above mobile devices, enable a teacher to demonstrate mobile device apps and content across the Internet, for distributed instructional purposes. FIG. 2 is a block schematic diagram showing a usage model in which a teacher shows instructional apps and content on an iOS device to students across the Internet according to the invention (see http://www.splashtop.com/classroom for an example of a classroom application with which the invention may be practiced). Similar to above, a teacher can go through the same steps to show his iPad screen on a remote computer. The remote computer can then be viewed by one or multiple remote students at different locations.

The technology can also be used to broadcast the apps and content to multiple mobile devices and computers in the same classroom as the teacher.

For above mobile devices, enable a business presenter to demonstrate mobile device apps and content across the Internet, for business, sales, or collaboration purposes.
For above mobile devices, stream live gameplay of mobile games to game spectators on the Internet.
Using the central servers, record the instructional sessions or gameplay for future use.

Examples of LAN Protocols

The following are examples of LAN protocols:

AirPlay—for displaying the screen of an iOS device on an AirPlay receiver within the LAN. See, for example, http://en.wikipedia.org/wiki/AirPlay and http://nto.github.io/AirPlay.html.

Bonjour—for broadcasting the availability of various resources (printer, file storage, multimedia devices, etc.) within the LAN. See, for example, http://en.wikipedia.org/wiki/Bonjour_(software) and https://developer.apple.com/library/mac/documentation/Cocoa/Conceptual/NetServices/Articles/Net ServicesArchitecture.html#//apple_ref/doc/uid/20001074-SW1.

Chromecast—for displaying the screen of an Android device on another device within the LAN http://en.wikipedia.org/wiki/Chromecast#Device_discovery_protocols.

Miracast—also for displaying the screen of one device on another device within the LAN; used by Android and Windows devices. See, for example, http://en.wikipedia.org/wiki/Miracast.

DLNA—for sharing digital media between multimedia devices. See, for example, http://en.wikipedia.org/wiki/Digital_Living_Network_Alliance.

All of the above are LAN protocols that, without modifications, work only within a LAN. Their services are not available to users not within the same LAN. However, they are all potential candidates for enhancement by this invention. Those skilled in the art will appreciate that other protocols may, as well, be used in connection with the invention.

Replacing the Discovery Phase of the AirPlay Protocol

Embodiments of the invention include perform AirPlay's discovery phase in a different way, instead of relying on AirPlay's default discovery mechanism, which is Bonjour. This new way enables all the aforementioned possibilities and benefits to apply to AirPlay.

Figure 3:
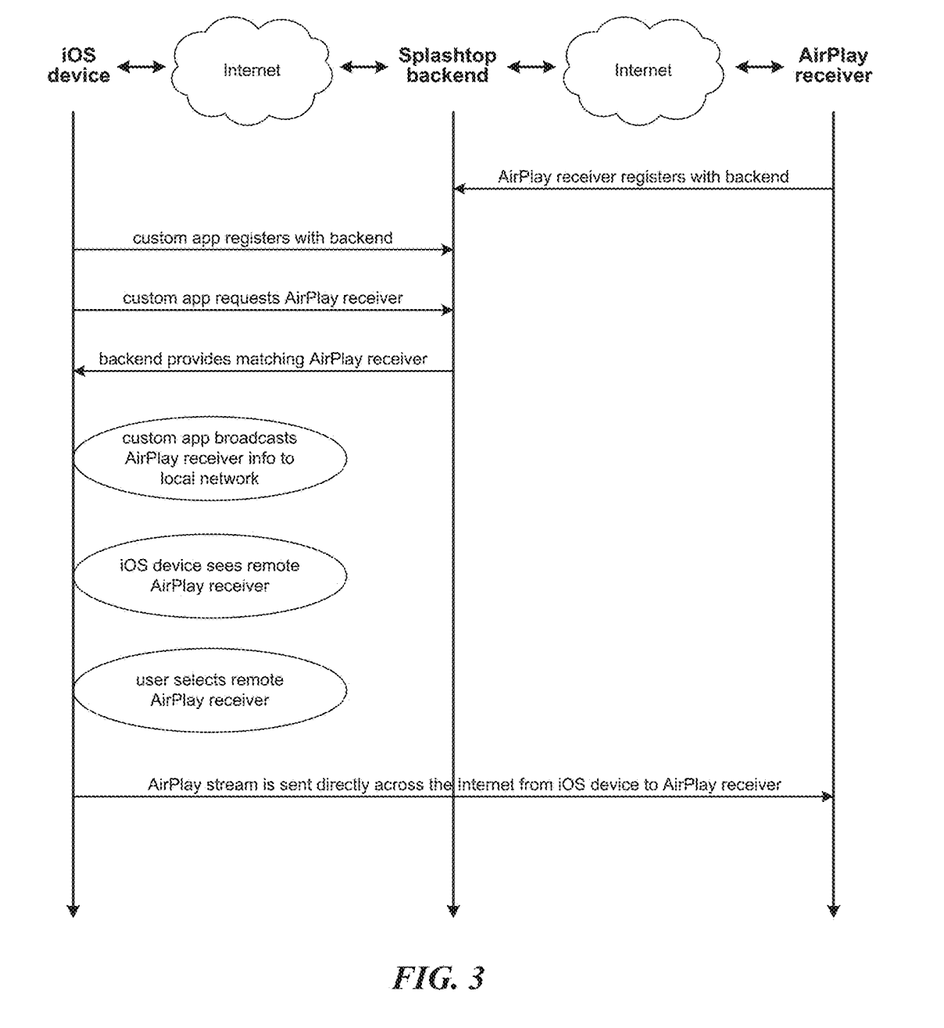
FIG. 3 is a block schematic diagram showing the protocol sequence that has been extended to work across the Internet according to the invention with regard to extending local area network protocols to work across the Internet.

FIG. 3 is a block schematic diagram showing the protocol sequence for the AirPlay protocol that has been extended to work across the Internet according to the invention.

AirPlay's discovery phase entails an AirPlay receiver broadcasting its availability to all iOS devices within its LAN. Those iOS devices can then stream their screens to the AirPlay receiver. In embodiments of the invention, a custom app running on an iOS device spoofs the availability of an AirPlay receiver that is at an arbitrary location outside of the LAN, based on an arbitrary set of rules. The custom app first communicates with one or more central servers to obtain an IP address and other attributes of an AirPlay receiver on the Internet. The central servers can select the appropriate AirPlay receiver based on certain pre-defined rules.

One common rule is based on the relationship between the user and the support technician. There are many users and many support technicians. The central servers ensure that user A is given the information of the AirPlay receiver that belongs to the support technician who is contracted to support user A. Another rule is that central servers look at the availability of AirPlay receivers and only provide one that is not in use and that is in close proximity to the user for better performance.

The custom app then sends a multicast Domain Name System (mDNS) packet on the local area network which declares the remote AirPlay receiver as a local AirPlay receiver. The iOS device itself sees the multicast DNS packet and believes that a new AirPlay receiver is available within the same LAN. The user of the iOS device now sees the remote AirPlay receiver listed, alongside all the other AirPlay receivers that are local. Of course, the multicast DNS packet must fully conform to the format expected by the iOS devices to be accepted. The custom app can be running on one of the iOS devices, on another type of device within the LAN, or on another device on the Internet (given proper routing path).

Establishing Connectivity without Discovery for LAN Protocols

Embodiments of the invention also concern establishing connectivity without discovery for LAN protocols. These embodiments of the invention thus provide connectivity without discovery for local area network protocols, and are to be distinguished from the embodiments of the invention discussed above with regard to extending local area network protocols to work across the Internet and a distributed relay.

For local area network protocols, the discovery process is a simple "here I am" message to all devices. The receiving device must scan through these messages and see which one they want to use. In one implementation, a device can skip the discovery phase and attempt to connect to a specific computer or device by injecting the specific device information into the local area network protocols discovery list.

Figure 4:
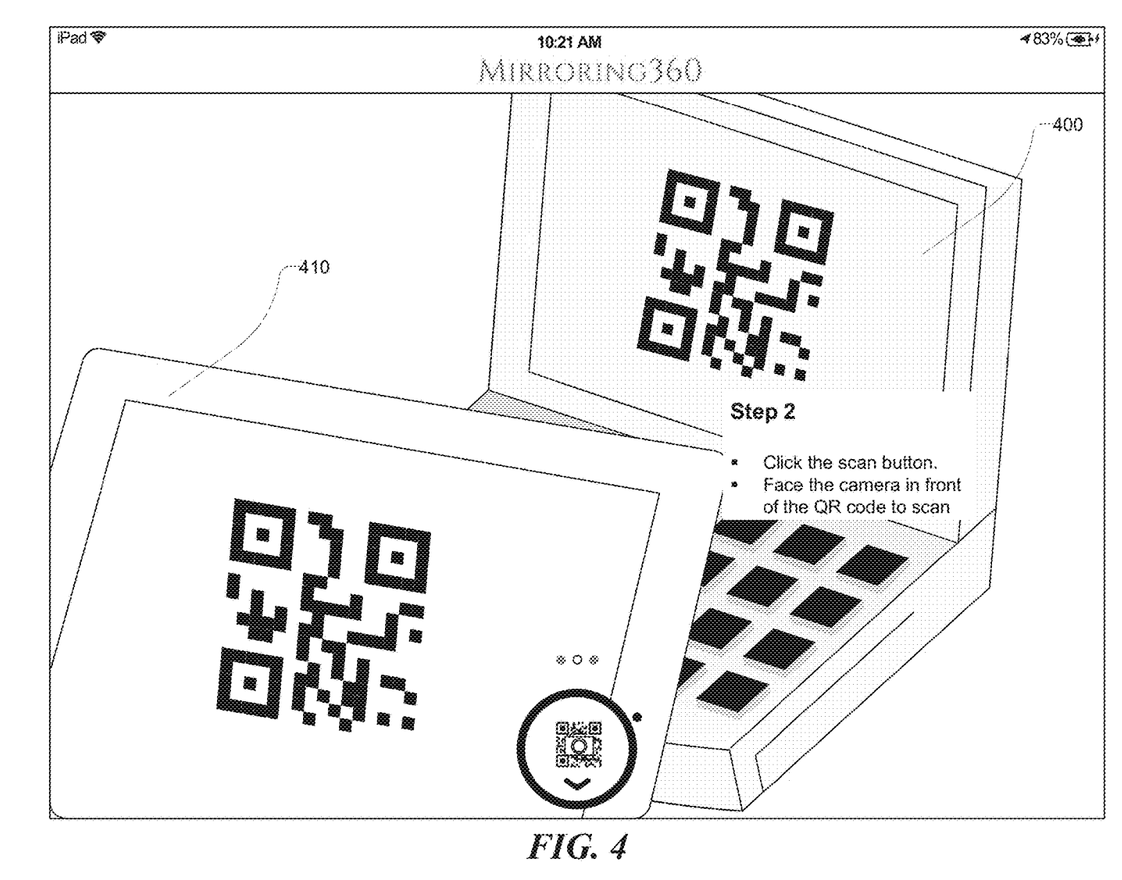
FIG. 4 is a diagram showing a second step in a method establishing connectivity without discovery for local area network protocols according to the another embodiment of the invention.

The first step in a method to establish connectivity without discovery for local area network protocols is to install a mirroring application on the first device, 400 in FIG. 4. The user selects "Connection Assistant" on the main interface.

FIG. 4 is a diagram showing a second step is a method establishing connectivity without discovery for local area network protocols according to another embodiment of the invention. In the second step, a second device 410 scans a QR code displayed on the first device 400.

Figure 5:
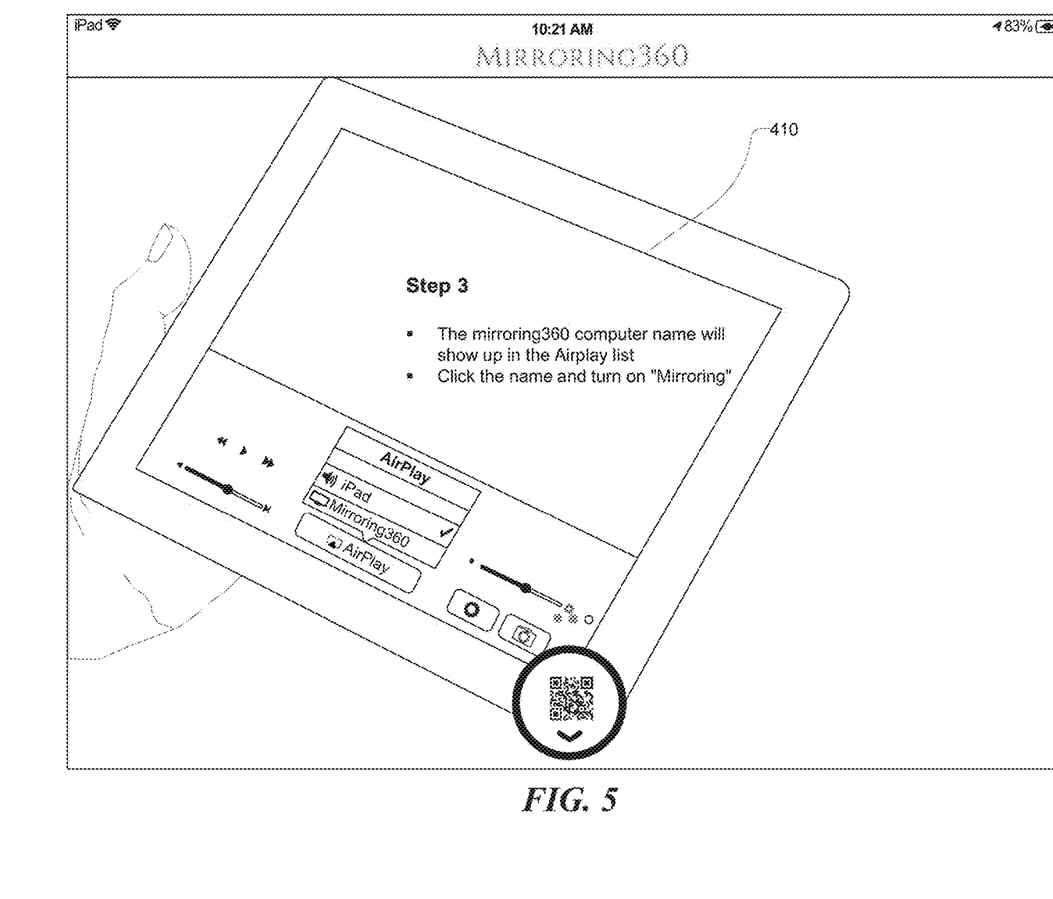
FIG. 5 is a diagram showing a third step in a method establishing connectivity without discovery for local area network protocols according to the another embodiment of the invention.

FIG. 5 is a diagram showing a third step in a method establishing connectivity without discovery for local area network protocols according to the another embodiment of the invention. In the third step, the first device's 400 name shows up in the Airplay list associated with a second device 410. The user clicks on the name and turns on mirroring.

For home use, where there are few devices, this works well. However, in large networks or companies the device list can be very long and difficult to wade through. A direct connection, "connect me to ABC" is cleaner and easier. By using a handle or session code, a user can connect to the known device without any discovery phase. In addition, one step further, a QR code is used to save the typing.

In embodiments of the invention, the handle/session code is a special, unique code that gets translated to an IP address or that is the IP address itself. To enable cross network connectivity for local area network protocols, the direct IP address allows the direct connection phase, or a unique ID can be used to allow a mediator service to track and manage the connections.

The following embodiments of the invention pertain to the use of mirroring, i.e. where the local area network protocols of Airplay are used:

An app is built on iOS. On the surface, the app teaches users how to use AirPlay. The content of the tutorial can be static webpage. There is a QR code/camera button in the app. On the mirroring side, i.e. the first device side 400, a discovery assistant dialog box is provided, such as a QR code image. On iOS app side, i.e. the second device side 410, the user scans the QR code. The QR code has the information of mirror's IP address. The app then uses mDNS to insert the server, i.e. the first device 400, into the AirPlay list.

An alternative is: on the mirror side, i.e. the first device side 400, the system talks to the back end (BE) and sends its IP address over. The BE keeps this value, and returns a hashed code to the mirror. The mirror shows the code, e.g. 123456, to the user. The user opens a standard URL on the second device 410, for example, in his iPad Safari, i.e. m360.splashtop.com/discovery. This page requires the user to type in the code. The page uses a URL with the code embedded, retrieved from the BE, to launch the mirror assistant app. The app then uses mDNS to insert the server, i.e. the first device 400, into the AirPlay list. This approach hides the entry point, and leaves the app to be a pure tutorial app.

Computer

Figure 6:
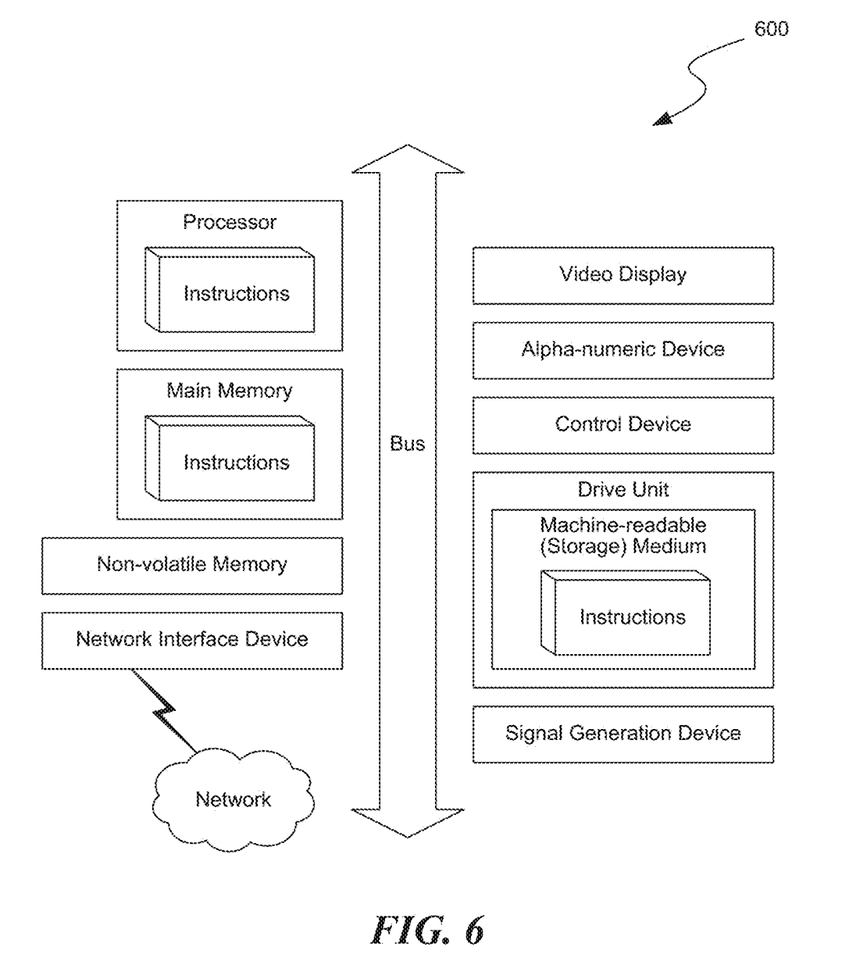
FIG. 6 is a block schematic diagram that illustrates a machine in the example form of a computer system within which a set of instructions for causing the machine to perform one or more of the methodologies discussed herein, with regard to both extending local area network protocols to work across the Internet and distributed relays, may be executed.

FIG. 6 is a diagrammatic representation of a machine in the example form of a computer system 600 within which a set of instructions, for causing the machine to perform any one or more of the methodologies or modules discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components described in the example of FIGS. 1-5 (and any other components described in this specification) can be implemented. The computer system 600 can be of any applicable known or convenient type. The components of the computer system 600 can be coupled together via a bus or through some other known or convenient device.

This disclosure contemplates the computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method in a computer system, having a processor and a memory, of extending a local area network (LAN) protocol to work across the Internet, and enabling a resource inside the LAN to be accessible by a receiver outside of the LAN, the method comprising:

sending, by the processor associated with a first device associated with the LAN, a request to register the first device associated with the LAN, to a backend service outside the LAN;

sending, by the processor, a request to the backend service outside the LAN, said request comprising a query for an identification associated with the receiver outside of the LAN, and a criterion that the receiver is capable of receiving a LAN protocol packet;

receiving, by the processor, the identification associated with the receiver outside of the LAN, wherein the identification corresponds to an Internet Protocol (IP) address associated with the receiver outside of the LAN, and wherein the receiver outside of the LAN satisfies the criterion;

receiving, by the processor, a first LAN protocol packet from the receiver outside of the LAN, wherein the LAN protocol packet comprises the IP address associated with the receiver outside of the LAN, and a first declaration that the receiver outside of the LAN is available to receive a plurality of LAN protocol packets associated with a plurality of devices associated with the LAN;

creating, by the processor, a virtual IP address associated with the LAN, and a correspondence between the virtual IP address and the IP address associated with the receiver outside of the LAN;

sending, by the processor, a multicast Domain Name System (mDNS) packet to the plurality of devices associated with the LAN, wherein the mDNS packet comprises the virtual receiver IP address, and a second declaration that a device associated with the virtual receiver IP address is available to receive the plurality of LAN protocol packets associated with the plurality of devices associated with the LAN;

receiving, by the processor, from a second device associated with the LAN a second LAN protocol packet, the second LAN protocol packet comprising the virtual receiver IP address, and a digital content;

changing, by the processor, the virtual receiver IP address in the second LAN protocol packet to be the IP address associated with the receiver outside of the LAN; and upon said changing the virtual receiver IP address, sending, by the processor, the second LAN protocol packet to the receiver outside of the LAN.

2. The method of claim 1, further comprising:

generating, by the processor, a unique quick responsive (QR) code associated with the first device associated with the LAN, wherein the unique QR code corresponds to an IP address associated with the first device; and displaying, by the processor, the QR code on a screen of the first device associated with the LAN.

3. The method of claim 2, further comprising:

scanning, by a second processor associated with the second device associated with the LAN, the QR code displayed on the first device to the second device;

resolving, by the second processor, the QR code to an IP address associated with the first device; and based on the IP address, establishing, by the second processor, a direct wireless streaming connection via a LAN protocol between the first device associated with the LAN, and the second device associated with the LAN.

4. The method of claim 1, wherein the first device and the second device are the same device.

5. The method of claim 1, further comprising routing the second LAN protocol packet received from the second device inside the LAN to a plurality of receivers outside of the LAN.

6. The method of claim 1, further comprising recording the digital content from the second LAN protocol packet.

7. The method of claim 1, further comprising enabling a screen of the second device associated with the LAN to be viewed on the receiver outside of the LAN.

8. The method of claim 1, wherein the receiver outside of the LAN has available bandwidth and is in close geographical proximity to the second device associated with the LAN.

9. A method in a computer system, having a processor and a memory, of extending a local area network (LAN) protocol to work across the Internet, and enabling a resource inside the LAN to be accessible by a receiver outside of the LAN, the method comprising:

installing, by the processor, a backend software on the processor, the processor enabled to communicate with the receiver outside of the LAN and a device associated with the LAN;

sending, by the processor, a request, the request comprising a query for an identification associated with the receiver outside of the LAN, a first criterion that the receiver is enabled to receive a LAN protocol packet, and a second criterion;

receiving, by the processor, the identification associated with the receiver outside of the LAN wherein the identification corresponds to an Internet Protocol (IP) address associated with the receiver outside of the LAN, and wherein the receiver outside of the LAN satisfies the first criterion and the second criterion;

receiving, by the processor, from a custom software associated with the device associated with the LAN a request to register the device with the processor;

registering, by the processor, the device associated with the LAN with the backend software;

receiving from the custom software associated with the device associated with the LAN a request for the identification associated with the receiver outside of the LAN; and sending the identification associated with the receiver outside of the LAN to the device associated with the LAN.

10. The method of claim 9, wherein the second criterion comprises that the receiver outside of the LAN is in a specific geography.

11. The method of claim 9, wherein the second criterion comprises that the receiver outside of the LAN is associated with a user authorized to access the resource inside the LAN.

12. The method of claim 9, wherein the second criterion comprises that the receiver outside of the LAN is associated with an organization authorized to access the resource inside the LAN.

13. The method of claim 9, wherein the resource inside the LAN comprises a first resource inside the LAN and a second resource inside the LAN.

14. The method of claim 13, and wherein said sending, by the processor, the request, comprises:

identifying a first group of users authorized to access the first resource;

identifying a second group of users authorized to access the second resource;

sending, by the processor, a first request comprising a first query for a first identification associated with a first receiver outside of the LAN, the first criterion that the first receiver is enabled to receive the LAN protocol packet, and the second criterion that the first receiver outside of the LAN is associated with the first group of users; and sending, by the processor, a second request comprising a second query for a second identification associated with a second receiver outside of the LAN, a third criterion that the second receiver is enabled to receive the LAN protocol packet, and a fourth criterion that the second receiver outside of the LAN is associated with the second group of users.

15. The method of claim 9, wherein the LAN protocol comprises AirPlay, Bonjour, Chromecast, Miracast, DNLA.

16. The method of claim 9, wherein the resource inside the LAN comprises a printer.

17. The method of claim 9, wherein the resource inside the LAN comprises a software installed on the device associated with the LAN.

18. A system configured to extend a local area network (LAN) protocol to work across the Internet, and to enable a resource inside the LAN to be accessible by a receiver outside of the LAN, comprising:

a first processor of a first device associated with the LAN;

a storage medium storing computer-executable instructions that, when executed by the first processor, cause the system to perform a computer-implemented operation, the instructions comprising:

instructions for sending a request to register the first device associated with the LAN, to a backend service outside the LAN;

instructions for sending a request to the backend service outside the LAN, the request comprising a query for an identification associated with the receiver outside of the LAN, and a criterion that the receiver is capable of receiving a LAN protocol packet;

instructions for receiving the identification associated with the receiver outside of the LAN, wherein the identification corresponds to an Internet Protocol (IP) address associated with the receiver outside of the LAN, and wherein the receiver satisfies the criterion;

instructions for creating a virtual IP address associated with the LAN, and a correspondence between the virtual IP address and the IP address associated with the receiver outside of the LAN;

instructions for sending a multicast Domain Name System (mDNS) packet to a plurality of devices associated with the LAN, wherein the mDNS packet comprises the virtual receiver IP address, and a declaration that a device associated with the virtual receiver IP address is available to receive a plurality of LAN protocol packets associated with the plurality of devices associated with the LAN;

instructions for receiving from a second device associated with the LAN a second LAN protocol packet, the second LAN protocol packet comprising the virtual receiver IP address, and a digital content;

instructions for changing the virtual receiver IP address in the second LAN protocol packet to be the IP address associated with the receiver outside of the LAN; and instructions for, upon said changing the virtual receiver IP address, sending the second LAN protocol packet to the receiver outside of the LAN.

19. The system of claim 18, further comprising:

instructions for generating a unique quick responsive (QR) code associated with the first device associated with the LAN, wherein the unique QR code corresponds to an IP address associated with the first device; and instructions for displaying the QR code on a screen of the first device associated with the LAN.

20. The system of claim 19, further comprising:

a second processor of the second device associated with the LAN;

a second storage medium storing computer-executable instructions that, when executed by the second processor, cause the system to perform the computer-implemented operation, the instructions comprising:

instructions for scanning the QR code displayed on the first device to the second device;

instructions for resolving the QR code to an IP address associated with the first device; and instructions for, based on the IP address, establishing a direct wireless streaming connection via a LAN protocol between the first device associated with the LAN, and the second device associated with the LAN.

* * * * *